Figure 1:
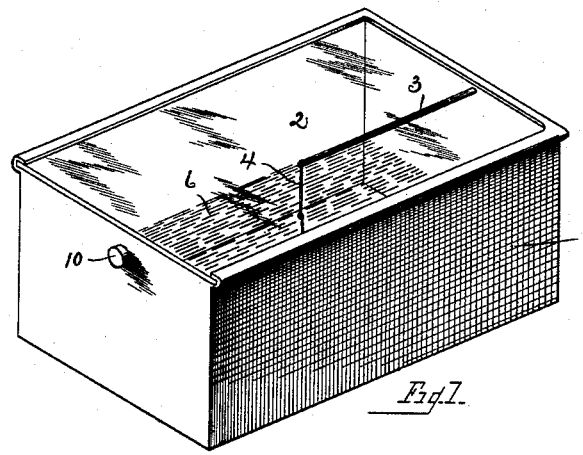

(No Model.)

J. A. SLOAN.
PUZZLE.

No. 483,772.  Patented Oct. 4, 1892.

WITNESSES
Carroll J. Webster
Grace E. Lehaney

INVENTOR
Joseph A. Sloan
By
William Webster
Atty.

UNITED STATES PATENT OFFICE.

JOSEPH A. SLOAN, OF TOLEDO, OHIO.

PUZZLE.

SPECIFICATION forming part of Letters Patent No. 483,772, dated October 4, 1892.

Application filed June 4, 1892. Serial No. 435,521. (No model.)

*To all whom it may concern:*

Be it known that I, JOSEPH A. SLOAN, of Toledo, county of Lucas, and State of Ohio, have invented certain new and useful Improvements in Puzzles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a puzzle of that character in which is employed a receptacle containing a fluid having loosely floating thereon an emblematic object, such as a fish, and a suspended emblematic object, such as a hook, whereby when the box is agitated the operator's skill and patience are exercised to catch the floating object on the suspended object by means of the agitation of the fluid.

The invention consists in the parts and combination of parts, as shown in the drawings, described in the specification, and pointed out in the claims.

Figure 2:
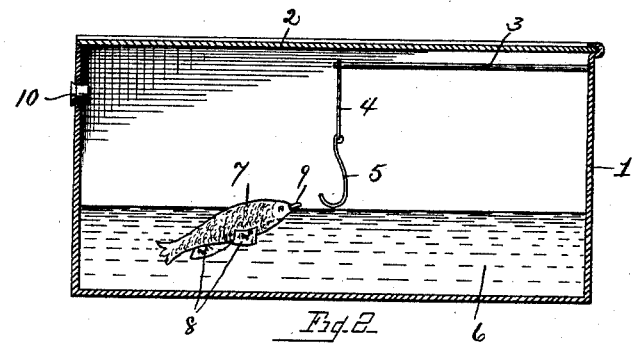
Figure 3:
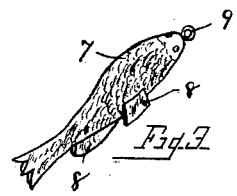

In the drawings, Figure 1 is a perspective view of the puzzle constructed in accordance with my invention. Fig. 2 is a longitudinal vertical sectional view of the device, this view illustrating the position of the parts when at rest. Fig. 3 is a detail view of the fish, illustrating more particularly the perforation in the mouth of the fish by which it is caught.

1 designates the receptacle in which the parts are placed. As shown in the drawings, the receptacle is of an elongated rectangular form; but I may form the receptacle of any form or shape. The top 2 of the receptacle is formed of transparent material—such as glass—to afford a view of the operation of the puzzle, as will be hereinafter explained.

3 designates a projecting arm, one end being secured to one side of the receptacle near the top, the opposite end extending to near the center of the receptacle, and to which is attached a cord or flexible hanger 4 for the hook 5.

6 designates a fluid—such as water—with which receptacle 1 is filled to approximately near the lower end of hook 5, on which floats the fish 7, having the under side weighted, as at 8, to at all times keep the same right side up.

9 designates a perforation in the mouth of the fish of a size to be entered by the end of hook 5. Transparent top 2 may be either loosely secured to the receptacle by sliding in ways formed in the same or the glass may be hermetically sealed to the receptacle, in which case I provide an opening in the receptacle, in which fits stopper 10 to seal the egress of water therefrom.

In operation the receptacle is filled with water, as has been heretofore described, when the operator, by tipping the device one way and then the other, will cause the fish to pass the hook, and by means of the rise and fall of the water the head of the fish is caused to rise above the hook and then lower below the same, whereby by the exercise of skill and patience the hook is caused to enter the perforation in the mouth of the fish, when the same is caught and the puzzle is solved.

It will be understood that while I have shown the hook as suspended from the side of the receptacle I may also suspend it from the top, the essential features of the invention being the suspended hook and the floating fish.

What I claim is—

1. In a puzzle, a receptacle having contained therein a flexibly-suspended object having a projecting point and a floating object formed with a perforation to engage the projecting point.

2. A puzzle comprising a receptacle, a hook flexibly suspended in the same, a liquid substance partially filling the receptacle, having floating thereon a weighted object having a perforation which by the skill of the operator is caused to engage the hook.

In testimony that I claim the foregoing as my own I hereby affix my signature in presence of two witnesses.

JOSEPH A. SLOAN.

Witnesses:
E. B. SOUTHARD,
CARROLL J. WEBSTER.